United States Patent
Jun et al.

(10) Patent No.: US 10,323,182 B2
(45) Date of Patent: *Jun. 18, 2019

(54) NANOCRYSTAL-METAL OXIDE COMPOSITE, METHODS OF MANUFACTURE THEREOF AND ARTICLES COMPRISING THE SAME

(75) Inventors: Shin Ae Jun, Seongnam-si (KR); Eun Joo Jang, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 838 days.

This patent is subject to a terminal disclaimer.

(21) Appl. No.: 12/399,440

(22) Filed: Mar. 6, 2009

(65) Prior Publication Data

US 2010/0059743 A1    Mar. 11, 2010

(30) Foreign Application Priority Data

Sep. 5, 2008  (KR) .......................... 10-2008-0087959

(51) Int. Cl.
| | |
|---|---|
| C09K 11/54 | (2006.01) |
| C09K 11/56 | (2006.01) |
| B82Y 30/00 | (2011.01) |
| C01B 19/00 | (2006.01) |
| C01G 1/12 | (2006.01) |

(Continued)

(52) U.S. Cl.
CPC ............ C09K 11/565 (2013.01); B82Y 30/00 (2013.01); C01B 19/007 (2013.01); C01G 1/12 (2013.01); C01G 11/02 (2013.01); C09C 1/10 (2013.01); C09K 11/883 (2013.01); *C01P 2002/84* (2013.01); *C01P 2002/86* (2013.01); *C01P 2004/64* (2013.01); *C01P 2006/40* (2013.01)

(58) Field of Classification Search
CPC ....... C01B 19/007; C09C 1/10; C09K 11/565; C09K 11/883; C09K 11/02
USPC ........................................ 516/100; 252/519.2
See application file for complete search history.

(56) References Cited

U.S. PATENT DOCUMENTS

| 5,814,370 A | * | 9/1998 | Martino et al. .......... 427/213.35 |
| 6,423,551 B1 | * | 7/2002 | Weiss et al. ................. 436/518 |

(Continued)

FOREIGN PATENT DOCUMENTS

| CN | 101280185 A | * | 10/2008 |
| JP | 2008285753 A | * | 11/2008 |

(Continued)

OTHER PUBLICATIONS

Derwent Abstract, week 200910, London: Derwent Publications Ltd., AN 2008-O11228, Class A85, JP 2008285753 A or KR 853086 B1, (SAMSUNG ELECTRONICS CO LTD), abstract.*

(Continued)

Primary Examiner — Michael A Salvitti
(74) Attorney, Agent, or Firm — Cantor Colburn LLP (57) ABSTRACT

A method for preparing nanocrystal-metal oxide composites with long-term stability is disclosed herein. The nanocrystals are mixed with a first metal oxide precursor, a solvent and water to form a sol-gel composite. The sol-gel composite is pulverized to form a sol-gel composite powder. The sol-gel composite is then reacted with a second metal oxide precursor. The nanocrystal-metal oxide composites have a high luminescence efficiency and uniform emission wavelengths. The nanocrystal-metal oxide composite is used to manufacture a light-emitting device.

15 Claims, 7 Drawing Sheets

(51) Int. Cl.
*C01G 11/02* (2006.01)
*C09C 1/10* (2006.01)
*C09K 11/88* (2006.01)

(56) References Cited

U.S. PATENT DOCUMENTS

| | | | | |
|---|---|---|---|---|
| 6,869,864 | B2* | 3/2005 | Yim et al. | 438/497 |
| 8,221,791 | B1* | 7/2012 | Santra | A01N 59/20 424/484 |
| 8,309,170 | B2* | 11/2012 | Jang | C30B 7/14 427/212 |
| 8,368,091 | B2* | 2/2013 | Jang | C09K 11/02 257/89 |
| 9,202,997 | B2* | 12/2015 | Jang | H04L 33/56 |
| 9,701,898 | B2* | 7/2017 | Lee | C09K 11/025 |
| 2003/0017264 | A1* | 1/2003 | Treadway et al. | 427/212 |
| 2005/0022697 | A1* | 2/2005 | Benrashid et al. | 106/287.13 |
| 2005/0107478 | A1* | 5/2005 | Klimov et al. | 516/98 |
| 2006/0029802 | A1* | 2/2006 | Ying | C30B 29/60 428/403 |
| 2006/0234417 | A1 | 10/2006 | Isobe et al. | |
| 2007/0045777 | A1* | 3/2007 | Gillies | A61K 8/23 257/613 |
| 2007/0087197 | A1* | 4/2007 | Jang et al. | 428/403 |
| 2007/0116638 | A1* | 5/2007 | Petruska | B01J 13/00 423/509 |
| 2008/0121844 | A1* | 5/2008 | Jang et al. | 252/301.33 |
| 2008/0252209 | A1* | 10/2008 | Jang | C30B 7/14 313/506 |
| 2008/0290936 | A1* | 11/2008 | Jun et al. | 327/603 |
| 2009/0058264 | A1* | 3/2009 | Jun et al. | 313/503 |
| 2010/0059743 | A1* | 3/2010 | Jun | B82Y 30/00 257/43 |
| 2012/0091406 | A1* | 4/2012 | Jang | C09K 11/02 252/519.34 |
| 2017/0306222 | A1* | 10/2017 | Lee | B24B 1/00 |

FOREIGN PATENT DOCUMENTS

| | | | |
|---|---|---|---|
| KR | 1020020060813 A | | 7/2002 |
| KR | 1020070119104 A | | 12/2007 |
| KR | 1020080031511 A | | 4/2008 |
| WO | WO 2005/049711 A2 | * | 6/2005 |
| WO | WO 2007/123846 A2 | * | 11/2007 |

OTHER PUBLICATIONS

Rogach et al, "'Raisin Bun'—Type Composite Spheres of Silica and Semiconductor Nanocrystals", Chem. Mater. 2000, 12, 2676-2685 (Publ. on Web Aug. 31, 2000).*

Derwent Abstract, week 201238, London: Derwent Publications Ltd., AN 2005-417695, Class A85, WO 2005049711 A2, (LOS ALAMOS NAT SECURITY, LCC; UNIV CALIFORNIA), abstract.*

Mulvaney, P., et al. "Silica encapsulation of quantum dots and metal clusters." Journal of Materials Chemistry 10.6 (2000): 1259-1270.*

Derwent Abstract on EAST, week 201113, London: Derwent Publications Ltd., AN 2008-O02622, Class E32, CN 101280185 A, (HU et al (UNIV DONGHUA)), abstract.*

Machine Translation of Publ. No. CN 101280185 (A), published Oct. 2008, European patent Office, obtained online @ http://ep.espacenet.com/ (Downloaded Aug. 28, 2017), pp. 1-5.*

Hawley's Condensed Chemical Dictionary, 5th Edition, Editor: Richard J. Lewis, Sr., Copyright © 2007 by John Wiley & Sons, Inc., Nanocrystals (11325) and Powder (13392), Published Online: Mar. 15, 2007, https://onlinelibrary.wiley.com/doi/book/10.1002/9780470114735 (Downloaded Jul. 26, 2018). (Year: 2007).*

Korean Office Action-KR Application No. 10-2008-0087959 dated Apr. 30, 2014, citing US2007/0116638 and US2006/0029802.

Notice of Allowance-KR Application No. 10-2009-0026824 dated Aug. 28, 2014.

Xie et al., "Synthesis and characterization of highly luminescent CdSe-Core CdS/Zn0.5Cd0.5Cd0.5S/ZnS multishell nanocrystals", JOURNAL OF THE AMERICAN CHEMICAL SOCIETY, vol. 127, pp. 7480-7488, 2005.

Xun Wang, "A general strategy for nanocrystal synthesis", Nature, vol. 437, pp. 121-124, 2005.

* cited by examiner

NANOCRYSTAL-METAL OXIDE COMPOSITE, METHODS OF MANUFACTURE THEREOF AND ARTICLES COMPRISING THE SAME

CROSS-REFERENCE TO RELATED APPLICATION

This application claims priority to Korean Patent Application No. 10-2008-87959, filed on Sep. 5, 2008, and all the benefits accruing therefrom under 35 U.S.C. § 119, the contents of which in its entirety are herein incorporated by reference.

BACKGROUND

1. Field

This disclosure relates to a method for preparing nanocrystal-metal oxide composites, methods of manufacture thereof, and to articles comprising the same. In one embodiment, the article is a light-emitting device (LED). More specifically, the method comprises mixing nanocrystals, a first metal oxide precursor, a solvent and water to form a sol-gel composite, and reacting the sol-gel composite with a second metal oxide precursor.

2. Description of the Related Art

In general, the luminescence and electrical properties of nanocrystals can be controlled by varying various parameters, such as, for example, the size and composition of the nanocrystals. As a result of the ability to vary these properties, nanocrystals have found application in various industrial fields, including light-emitting devices, solar cells, sensors, memory devices and other devices.

A semiconductor nanocrystal, also called a "quantum dot", is a crystalline material having dimensions that are of the order of a few nanometers. Since such nanometer-sized materials have large surface areas per unit volume, most of the constituent atoms of the material are present at the surface of the material and as a result, quantum confinement effects are observed in the material. Semiconductor nanocrystals generally absorb light from an excitation source to reach an excited state of energy and radiate energy corresponding to the energy band gap of the semiconductor nanocrystals. Thus, the structural and optical properties account for unique electrical, magnetic, optical, chemical and mechanical properties of semiconductor nanocrystals and these properties are different from those inherently displayed by bulk semiconductor materials having similar compositions.

In summary, the physical size or chemical composition of semiconductor nanocrystals are factors that determine the energy band gap of the semiconductor nanocrystals. Devices (e.g., displays and biological probes) are currently being developed that take advantage of the various energy levels of semiconductor nanocrystals.

Vapor deposition processes such as metal organic chemical vapor deposition (MOCVD) and molecular beam epitaxy (MBE) have been used to synthesize nanocrystals. Wet chemical methods are also used for growing nanocrystals from precursor materials that are dispersed in an organic solvent.

One of the disadvantages of nanocrystalline materials are that the nanocrystals are susceptible to oxidation and also tend to undergo agglomeration upon the application of certain external stimuli. These tendencies to undergo oxidation and to agglomerate make the nanocrystals unsuitable for use in practical applications.

SUMMARY

Disclosed herein is a method for preparing a nanocrystal-metal oxide composite, which includes mixing nanocrystals, a first metal oxide precursor, a solvent and water to form a sol-gel composite, and reacting the sol-gel composite with a second metal oxide precursor.

In one embodiment, the first and the second metal oxide precursors may independently have at least one organic functional group.

In another embodiment, the first and second metal oxide precursors may be each independently selected from the group consisting of siloxane compounds, silane compounds, silsesquioxane compounds, titanium oxide precursors, aluminum oxide precursors, vanadium oxide precursors, zinc oxide precursors, tungsten oxide precursors, zirconium oxide precursors, hafnium oxide precursors, yttrium oxide precursors, iron oxide precursors, tin oxide precursors, tantalum oxide precursors, cerium oxide precursors, chromium oxide precursors, and a combination comprising at least one of the foregoing compounds and precursors.

In yet another embodiment, the nanocrystals may be selected from the group consisting of Group II-VI compound nanocrystals, Group III-V compound nanocrystals, Group IV-VI compound nanocrystals, metal nanocrystals, and a combination comprising at least one of the foregoing nanocrystals.

In yet another embodiment, the nanocrystals may be further surface-treated with a surfactant having an affinity for the metal oxide precursors.

In yet another embodiment, the method may further comprise treating the surface or end portions of the nanocrystal-metal oxide composite with a capping material.

In one exemplary embodiment, the method may further comprise solidifying the nanocrystal-metal oxide composite to form a monolith; the monolith being a single indivisible unitary solid.

Also disclosed herein are nanocrystal-metal oxide composites prepared by aforementioned method.

Disclosed herein too is a light-emitting device using the nanocrystal-metal oxide composite.

Also disclosed herein is a nanocrystal-metal oxide composite comprising a sol-gel composite that comprises nanocrystals disposed in a first metal oxide.

Disclosed herein too is a nanocrystal-metal oxide composite in which a second metal oxide disposed on the sol-gel composite.

BRIEF DESCRIPTION OF THE DRAWINGS

Exemplary embodiments will be more clearly understood from the following detailed description taken in conjunction with the accompanying drawings, in which.

DETAILED DESCRIPTION

The disclosure now will be described more fully hereinafter with reference to the accompanying drawings, in which embodiments of the disclosure are shown. The details of this disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout.

It will be understood that when an element is referred to as being "on" another element, it can be directly on, the other element or intervening elements may be present. As used herein, the term "and/or" includes any and all combinations of one or more of the associated listed items.

It will be understood that, although the terms first, second, third, and the like, may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, components and/or groups, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the disclosure are described herein with reference to cross sectional illustrations that are schematic illustrations of idealized embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the disclosure.

Hereinafter, the disclosure will be described in detail with reference to the accompanying drawings.

In one embodiment, a method for a preparing nanocrystal-metal oxide composite is disclosed. Specifically, the method comprises mixing nanocrystals, a first metal oxide precursor, a solvent and water to form a sol-gel composite, and reacting the sol-gel composite with a second metal oxide precursor.

In one embodiment related to the method, the metal oxide precursors are introduced in a two-step procedure to prepare the nanocrystal-metal oxide composite. In the nanocrystal-metal oxide composite, the nanocrystals are dispersed in a transparent metal oxide matrix and can be prevented from generating surface defects. The metal oxide matrix may be a metal oxide sol-gel matrix. The metal oxide matrix formed through the two steps stabilizes the nanocrystals and protects the nanocrystals from damage or destruction that can be brought on when they are subjected to external stimuli.

Various active sites, such as, for example, functional groups present in the first metal oxide precursor, hydroxyl (—OH) groups, functional groups present on the surface of the nanocrystals or functional groups from a reaction catalyst, that remain unreacted in the sol-gel composites are inactivated by reaction with the second metal oxide precursor, contributing to an improvement in the long-term stability of the nanocrystal-metal oxide composite.

Figure 9:
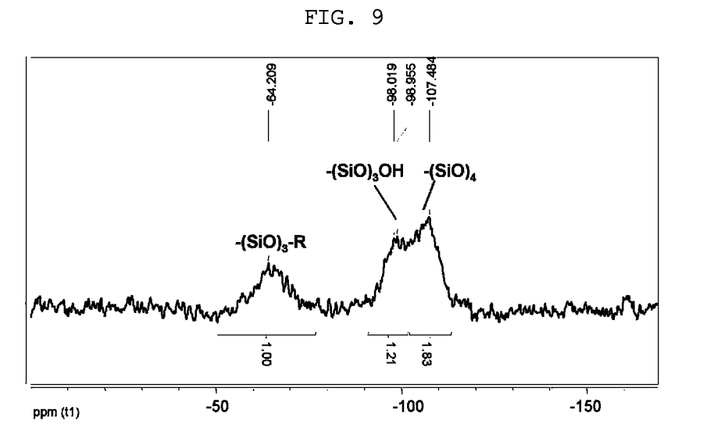
FIG. 9 is a $^{29}$Si MAS NMR spectrum of nanocrystal-metal oxide composites prepared in Comparative Example 1.
Figure 10:
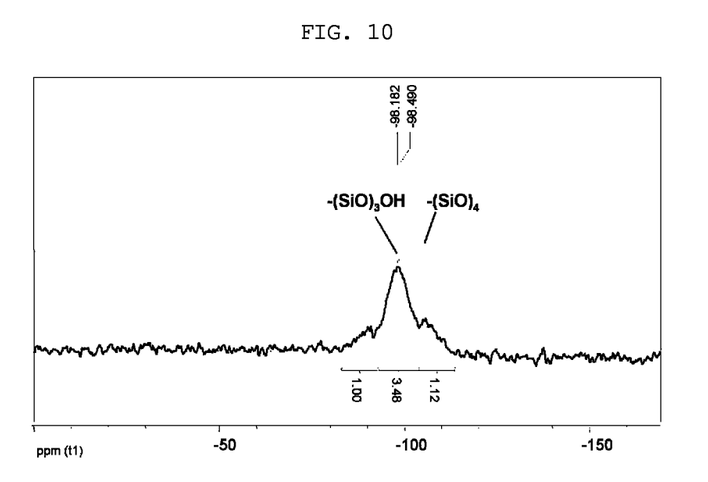
FIG. 10 is a $^{29}$Si MAS NMR spectrum of nanocrystal-metal oxide composites prepared in Comparative Example 3.

For example, a metal oxide precursor having a hydroxyl (—OH) group may remain unreacted in the sol-gel composites (see e.g., FIGS. 9 and 10, which will be described in detail later). In this case, the active hydroxyl group may damage the surface of the nanocrystals with time by responding to external environmental changes (e.g., with increasing temperature or humidity), thus causing a deterioration in the performance of the nanocrystal-metal oxide composite.

Figure 1:
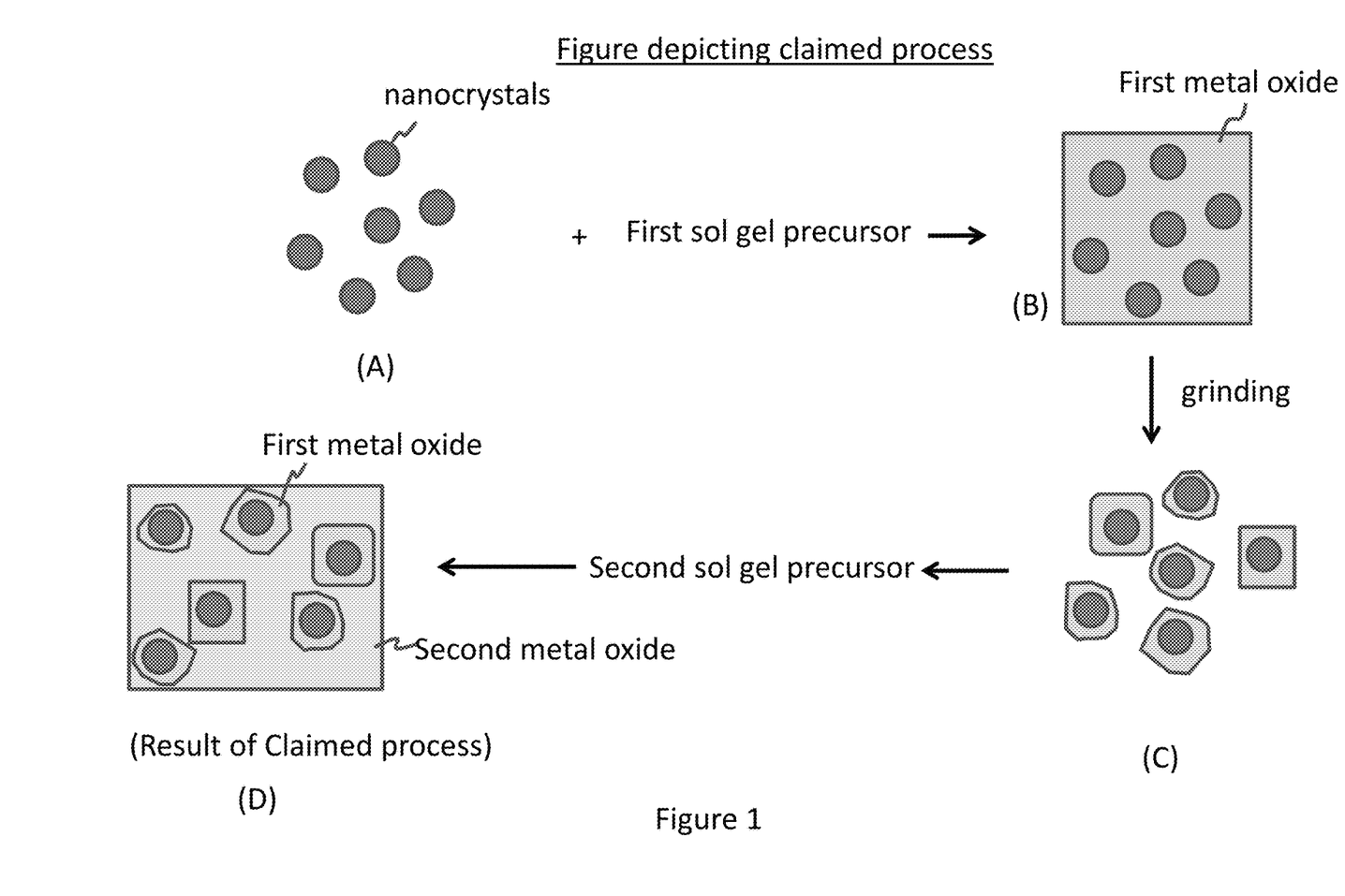
FIG. 1 is an exemplary schematic diagram illustrating states in which an active site of a metal oxide precursor are inactivated.

In one exemplary embodiment, the active hydroxyl group may be condensed ((i) of FIG. 1) or capped ((ii) of FIG. 1) by reaction with the second metal oxide precursor. As a result of the reaction, the nanocrystal-metal oxide composite can be stabilized for a long period of time.

The first metal oxide precursor may be any compound that can form a metal oxide. The metal oxide may be silica ($SiO_2$), titania ($TiO_2$), tin oxide ($SnO_2$), zinc oxide (ZnO), indium oxide-tin oxide ($In_2O_3$—$SnO_2$), alumina ($Al_2O_3$), tungsten oxide ($WO_3$), niobium oxide ($Nb_2O_5$), $TiSrO_3$, $InTiO_2$, iron oxide ($Fe_2O_3$), zirconium oxide ($ZrO_2$), hafnium oxide ($HfO_2$) or a combination comprising at least one of the foregoing metal oxides.

In one embodiment, the first metal oxide precursor may be selected from the group consisting of siloxane compounds, silane compounds, silsesquioxane compounds, titanium oxide precursors, aluminum oxide precursors, vanadium oxide precursors, zinc oxide precursors, tungsten oxide precursors, zirconium oxide precursors, hafnium oxide precursors, yttrium oxide precursors, iron oxide precursors, tin oxide precursors, tantalum oxide precursors, cerium oxide precursors, chromium oxide precursors, and a combination comprising at least one of the foregoing compounds and precursors.

The siloxane compounds include bis(triethoxysilyl)ethane, bis(triethoxysilyl)butane, bis(triethoxysilyl)octane, bis(trimethoxysilyl)ethane, bis(trimethoxysilyl)butane, bis(trimethoxysilyl)octane, bis(triethoxysilyl)ethylene, bis(trimethoxysilyl)ethylene, bis(triethoxysilyl)acetylene, bis(trimethoxysilyl)acetylene, 1,3,5-tris(diethoxysilyl)cyclohexane, 1,3,5-tris(triethoxysilyl)benzene, and a combination comprising at least one of the foregoing siloxane compounds.

The silane compounds include methyltrimethoxysilane, dimethyldimethoxysilane, propyltrimethoxysilane, propyltriethoxysilane, dipropyldimethoxysilane, octyltrimethoxysilane, octyltriethoxysilane, dioctyldimethoxysilane, hexadecyltriethoxysilane, ethyltriethoxysilane (ETrEOS), trimethoxysilane (TMS), trimethylchlorosilane (TMCS), octadecyltrichlorosilane, vinyltrimethoxysilane, vinyltriethoxysilane, 3-mercaptopropylsilane (MPS), 3-aminopropyltrimethoxysilane (3-APS), hexamethyldisilazane (HMDS), tetramethylorthosilicate (TMOS), tetraethylorthosilicate (TEOS), methyltrimethoxysilicate (MTMS), 3-aminopropyltrimethoxysilicate, and a combination comprising at least one of the foregoing silane compounds.

The silsesquioxane compounds include 2,4,6,8-tetramethyl-2,4,6,8-tetra(trimethoxysilylethoxy)cyclotetrasiloxane.

The titanium oxide precursors include titanium chloride, titanium methoxide, titanium ethoxide, titanium propoxide, titanium butoxide, and a combination comprising at least one of the foregoing titanium compounds.

The zirconium oxide ($ZrO_2$) precursors include zirconium chloride, zirconium ethoxide, zirconium hydroxide, zirconium isopropoxide, and a combination comprising at least one of the foregoing zirconium oxide compounds.

In one embodiment, the first metal oxide precursor may have at least one organic functional group. A shrinkage in volume may occur during the formation of the sol-gel composite. This shrinkage in volume is generally brought about by capillarity forces, which apply a mechanical stress to the composite, leaving behind many defects such as cracks and pores within the composites. The elasticity of the organic functional group included in the first metal oxide precursor improves the processability and mechanical stability of the final nanocrystal-metal oxide composites. In addition, another advantage associated with the use of the metal oxide precursor having at least one organic functional group is that the affinity of the metal oxide precursor for the nanocrystals is improved thus making the nanocrystals more dispersible in the sol-gel composite.

In one embodiment, the nanocrystals may be metal nanocrystals, semiconductor nanocrystals or a combination comprising at least one of the foregoing metal nanocrystals or the semiconductor nanocrystals. The metal nanocrystals may be nanocrystals of a metal selected from gold (Au), silver (Ag), palladium (Pd), platinum (Pt), cobalt (Co), iron (Fe), nickel (Ni), copper (Cu), manganese (Mn), and a combination comprising at least one of the foregoing metals. The semiconductor nanocrystals may be selected from the group consisting of Group II-VI compound nanocrystals, Group III-V compound nanocrystals, Group IV-VI compound nanocrystals, Group IV compound nanocrystals, and a combination comprising at least one of the foregoing semiconductor nanocrystals.

The Group II-VI compounds are selected from the group consisting of binary compounds such as CdS, CdSe, CdTe, ZnS, ZnSe, ZnTe, ZnO, HgS, HgSe and HgTe; ternary compounds such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe; and quaternary compounds such as CdZnSeS, CdZnSeTe, CdZnSTe, CdHgSeS, CdHgSeTe, CdHgSTe, HgZnSeS, HgZnSeTe and HgZnSTe.

The Group III-V compounds are selected from the group consisting of binary compounds such as GaN, GaP, GaAs, GaSb, AlN, AlP, AlAs, AlSb, InN, InP, InAs and InSb; ternary compounds such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AlInN, AlInP, AlInAs and AlInSb; and quaternary compounds such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

The Group IV-VI compounds are selected from the group consisting of binary compounds such as SnS, SnSe, SnTe, PbS, PbSe and PbTe; ternary compounds such as SnSeS, SnSeTe, SnSTe, PbSeS, PbSeTe, PbSTe, SnPbS, SnPbSe and SnPbTe; and quaternary compounds such as SnPbSSe, SnPbSeTe and SnPbSTe.

The Group IV compounds are selected from the group consisting of unary compounds, such as silicon (Si) and germanium (Ge); and binary compounds such as silicon carbide (SiC) and SiGe.

The semiconductor nanocrystals may further include an overcoating to form a core-shell structure. The overcoating may be formed of at least one material selected from Group II-VI compounds, Group III-V compounds, Group IV-VI compounds, and Group IV compounds.

In one embodiment, the nanocrystals may be surface-treated with a surfactant having an affinity for the metal oxide precursors. Examples of such surfactants include 2-aminoethanol, 2-amino-1-propanol, 3-amino-1-propanol, 2-amino-1-butanol, 3-amino-1-butanol, 4-amino-1-butanol, 3-amino-2-butanol, 2-amino-1-phenyl-1-butanol, 6-amino-1-hexanol, p-aminobenzenesulfonic acid, 3-aminobutyric acid, 4-aminobutyric acid, 4-amino-2-hydroxybutyric acid, 1,3-diamino-2-propanol, 3-mercaptopropionic acid, 4-phosphonobutyric acid, 3-aminopropyltriethoxysilane, (3-mercaptopropyl)trimethoxysilane, 3-(dimethoxymethylsilyl)-1-propanethiol, 3-mercapto-1-propanol, 4-mercapto-1-butanol, 6-mercapto-1-hexanol, 3-hydroxypropionitrile, 6-hydroxyhexanoic acid, 4-hydroxybutylphosphonic acid, tris(hydroxypropyl)phosphine oxide, bis(dibutyl)(hydroxypropyl)phosphine oxide, 3-mercaptopropylsilane (MPS), 6-mercaptohexanol (6-MHOH)-ethanol or a combination comprising at least one of the foregoing surfactants. These surfactants may be used alone or as a mixture of two or more thereof.

The semiconductor nanocrystals may be in amount from about 0.01 wt % to about 40 wt % with reference to the total weight of the nanocrystal-metal oxide composite.

In one embodiment, the solvent used in the formation of the sol-gel composite may be a polar solvent selected from the group consisting of acetone, ethyl acetate, dichloromethane, chloroform, dimethylformamide (DMF), tetrahydrofuran (THF), dimethylsulfoxide (DMSO), pyridine, alkylamines, alkyl alcohols such as, for example, methanol, ethanol and propanol; or a combination comprising at least one of the foregoing polar solvents.

The mole ratio of the solvent relative to the metal oxide precursor may be 1:1 to 20:1.

A reaction catalyst may be used in the formation of the sol-gel composite. Examples of such reaction catalysts include: basic catalysts, such as ammonia, alkylamines (e.g., propylamine, butylamine and triethylamine) sodium hydroxide (NaOH), 3-aminopropyltrimethoxysilane (3-APS) and a combination comprising at least one of the foregoing basic catalysts; and acidic catalysts, such as trifluoroacetic acid (FA), acetic acid, propionic acid, hydrochloric acid (HCl), and a combination comprising at least one of the foregoing acidic catalysts.

The mole ratio of the catalyst relative to the metal oxide precursor may be 0.001:1 to 10:1.

In one embodiment, the second metal oxide precursor may be any compound that can form a metal oxide. For example, the second metal oxide precursor can be selected from the aforementioned list of first metal oxide precursors. The second metal oxide precursor is selected independently of the selection of the first metal oxide precursor. That is, the second metal oxide precursor may be identical to or different from the first metal oxide precursor.

For example, the second metal oxide precursor may be selected from the group consisting of siloxane compounds, silane compounds, silsesquioxane compounds, titanium oxide precursors, aluminum oxide precursors, vanadium oxide precursors, zinc oxide precursors, tungsten oxide precursors, zirconium oxide precursors, hafnium oxide precursors, yttrium oxide precursors, iron oxide precursors, tin oxide precursors, tantalum oxide precursors, cerium oxide precursors, chromium oxide precursors, and a combination comprising at least one of the foregoing metal oxide precursors.

The mole ratio of the second metal oxide precursor relative to the first metal oxide precursor may be 0.05:1 to 100:1.

In one exemplary embodiment, the reaction of the sol-gel composite and the second metal oxide precursor may be conducted in a liquid or gas phase. Any process known in the art may be used to conduct the liquid or gas phase reaction.

For example, the liquid phase reaction can be conducted above the melting point of the solvent. In the case where the solvent is water, the liquid phase reaction is conducted at 90° C. for a time period of about 1 minute to about 1 hour. Then, the reaction mixture may be dried to evaporate the solvent, optionally followed by thermal treatment. The thermal treatment may be performed at a temperature of about 80° C. to about 500° C. for a time period of about 1 minute to about 1 hour.

The vapor phase reaction can be conducted by various processes, for example, MOCVD and MBE.

The liquid phase reaction or the vapor phase reaction can be conducted several times.

The reaction of the sol-gel composite with the second metal oxide precursor may be conducted in the absence of a reaction catalyst, or alternatively, it may be conducted in the presence of a reaction catalyst. There is no particular restriction on the kind of reaction catalyst and those basic and acidic catalysts listed above to catalyze the formation of the sol-gel composite can also be used to catalyze the reaction of the sol-gel composite with the second metal oxide precursor. The reaction catalyst used to react the sol-gel composite with the second metal oxide precursor can be selected independently of the catalyst that is used to form the sol-gel composite. In other words, the former reaction catalyst (that is used to form the sol-gel composite) may be identical to or different from the latter reaction catalyst (that is used to react the sol-gel composite with the second metal oxide precursor).

In one exemplary embodiment, the method may further comprise treating the surface or end portions of the products obtained in the previous step with a capping material.

In the capping step, active sites present at the surface or the end portions of the sol-gel composite or the reaction product of the sol-gel composite with the second metal oxide precursor are capped by the capping material. This capping contributes to a further improvement in the long-term stability of the nanocrystal-metal oxide composite.

Any compound that reacts with active sites present at the surface or end portions of the products obtained in the previous step can be used as the capping material. It is desirable for the capping materials to inactivate any reactive sites present on the surface or at the end portions of the reaction product. For example, the capping material may be selected from the group consisting of methoxytrimethylsilane (MTMS), trimethylchlorosilane (TMCS), hexamethyldisilazane (HMDS), octadecyltrichlorosilane, vinyltrimethoxysilane, vinyltriethoxysilane, or a combination comprising at least one of the foregoing silanes.

The capping step may be carried out by a liquid or gas phase reaction.

The capping step may be carried out once or repeated two or more times sequentially, if so desired.

In one embodiment, the method may further comprise solidifying the product obtained in the previous step to prepare the nanocrystal-metal oxide composite in the form of a monolith. The term "monolith" means a silica which radius is less than 2 mm.

As noted above, nanocrystal-metal oxide composites can be prepared by the method disclosed herein.

The nanocrystal-metal oxide composites comprise nanocrystals and a metal oxide that is bound to the nanocrystals. The metal oxide may be $SiO_2$, $TiO_2$, ZnO, $In_2O_3$—$SnO_2$, $Al_2O_3$, $WO_3$, $Nb_2O_5$, $TiSrO_3$, $InTiO_2$, $Fe_2O_3$, $ZrO_2$, $HfO_2$, or a combination comprising at least one of the foregoing metal oxides.

In one embodiment, the nanocrystal-metal oxide composites comprise semiconductor nanocrystals and a metal oxide bound to the semiconductor nanocrystals where the metal oxide is represented by Formula 1:

Formula (1)

wherein A is $NH_2$, SH, COOH, or $PO_3H_2$; $R^1$ is alkylene, alkenylene, cycloalkylene or cycloalkenylene; B is selected from and combinations thereof (where each M is titanium (Ti), zinc (Zn), silicon (Si), tin (Sn), tungsten (W), tantalum (Ta), zirconium (Zr), hafnium (Hf), aluminum (Al), yttrium (Y), iron (Fe), cesium (Ce) or chromium (Cr); $R^2$, $R^3$ and $R^4$ are each independently alkylene, alkenylene, heterocycloalkylene containing at least one heteroatom selected from nitrogen (N), sulfur (S), oxygen (O) and phosphorus (P), or a heterocycloalkenylene containing at least one heteroatom selected from N, S, O and P; l, m and n are each independently an integer including zero, with the proviso that l, m and n are not simultaneously 0, and x, y and z are each independently an integer from about 1 to about 3; and k is an integer from about 1 to about 20.

In the compound of Formula 1, the repeating units of B are randomly distributed. The metal M contained in the repeating units may be identical to or different from each other. For example, the repeating units may contain different metals and be randomly arranged in the metal oxide of Formula 1. Each x, y and z represents the number of the oxygen atom(s) capable of being bound to the respective metal M.

Specific exemplary embodiments of the compound of Formula 1 include, but are not limited to, compounds of Formulae 2 to 4:

Formula (2)

wherein A is N, NH, S, COO$^-$, $PO_3H^-$ or $PO_3^{2-}$, $R^1$ is alkylene, alkenylene, cycloalkylene or cycloalkenylene, each M is Ti, Zn, Si, Sn, W, Ta, Zr, Hf, Al, Y, Fe, Ce or Cr, $R^2$, $R^3$ and $R^4$ are each independently alkyl, alkenyl, heterocycloalkyl containing at least one heteroatom selected from N, S, O and P or heterocycloalkenyl containing at least one heteroatom selected from N, S, O and P, k is an integer from about 1 to about 20, and l, m and n are each independently an integer including zero, with the proviso that l, m and n are not simultaneously 0;

Formula (3)

wherein A, $R^1$, M, $R^2$, k, l and m are as defined in Formula 2;

Formula (4)

wherein A, $R^1$, M, $R^2$, $R^3$, $R^4$, k, l, m and n are as defined in Formula 2.

In another embodiment, a light-emitting device can comprise the nanocrystal-metal oxide composite prepared by the method.

In one embodiment, the nanocrystal-metal oxide composite may be directly disposed on a light-emitting surface of a light-emitting diode chip of a light-emitting device (e.g., a light-emitting diode (LED)).

In another embodiment, a monolithic nanocrystal-metal oxide composite may be mounted on the light-emitting surface of a light-emitting diode chip. The monolithic nanocrystal-metal oxide may be a monolayer or have a multilayer structure that comprises two or more layers.

In one exemplary embodiment, the nanocrystal-metal oxide composite may be composed of semiconductor nanocrystals and the metal oxide of Formula 1 bound to the semiconductor nanocrystals.

A more detailed description of exemplary embodiments will be described in more detail with reference to the following examples. However, these examples are given merely for the purpose of illustration and are not to be construed as limiting the scope of the embodiments.

EXAMPLES

Example 1

Step 1-1

CdSe/ZnS/CdS/ZnS semiconductor nanocrystals (NC, 1 weight percent ("wt %")) that emit light at 520 nanometers ("nm") are dispersed in toluene. Ethanol is added to the toluene solution (1 milliliter ("mL"), followed by centrifugation.

To the precipitate obtained from centrifugation are added 50 microliters ("μL") of 3-mercaptopropylsilane (MPS), 200 μL of tetraethylorthosilicate (TEOS), 100 μL of ethanol (EtOH), 100 μL of propylamine and 25 μL of water ($H_2O$). The mixture is stirred to obtain a transparent solution. The solution is dried at room temperature for 10 days and thermally treated at 100° C. for one hour.

Step 1-2

The products obtained in the previous step are pulverized using a mortar and pestle. 0.05 grams ("g") of the powder is sampled. 400 μL of TEOS, 200 μL of EtOH, 29.7 μL of $H_2O$ and 3.7 μL of 37% concentrated hydrochloric acid (HCl) are sufficiently mixed with the powdered sample at room temperature. The 37% concentrated hydrochloric acid serves as the catalyst for the reaction. The mixture is allowed to react in an oven at 80° C. for about 30 minutes. The reaction mixture is pulverized and thermally treated in a glove box at 100° C. for about 15 minutes to prepare a nanocrystal-metal oxide composite.

Comparative Example 1

A nanocrystal-metal oxide composite is prepared without undergoing Step 1-2.

Experimental Example 1

0.025 g of the composites prepared in Example 1 and 0.025 g of the composites prepared Comparative Example 1 were sampled. Each of the samples was mixed with 0.5 mL of an epoxy resin, disposed on an light emitting diode ("LED") device, and cured in an oven at 120° C. for 2 hours. The LED device is operated at 20 milliamperes ("mA"). The luminescent properties of the LED device are evaluated as a function of time. The results are shown in FIG. 2.

Figure 2:
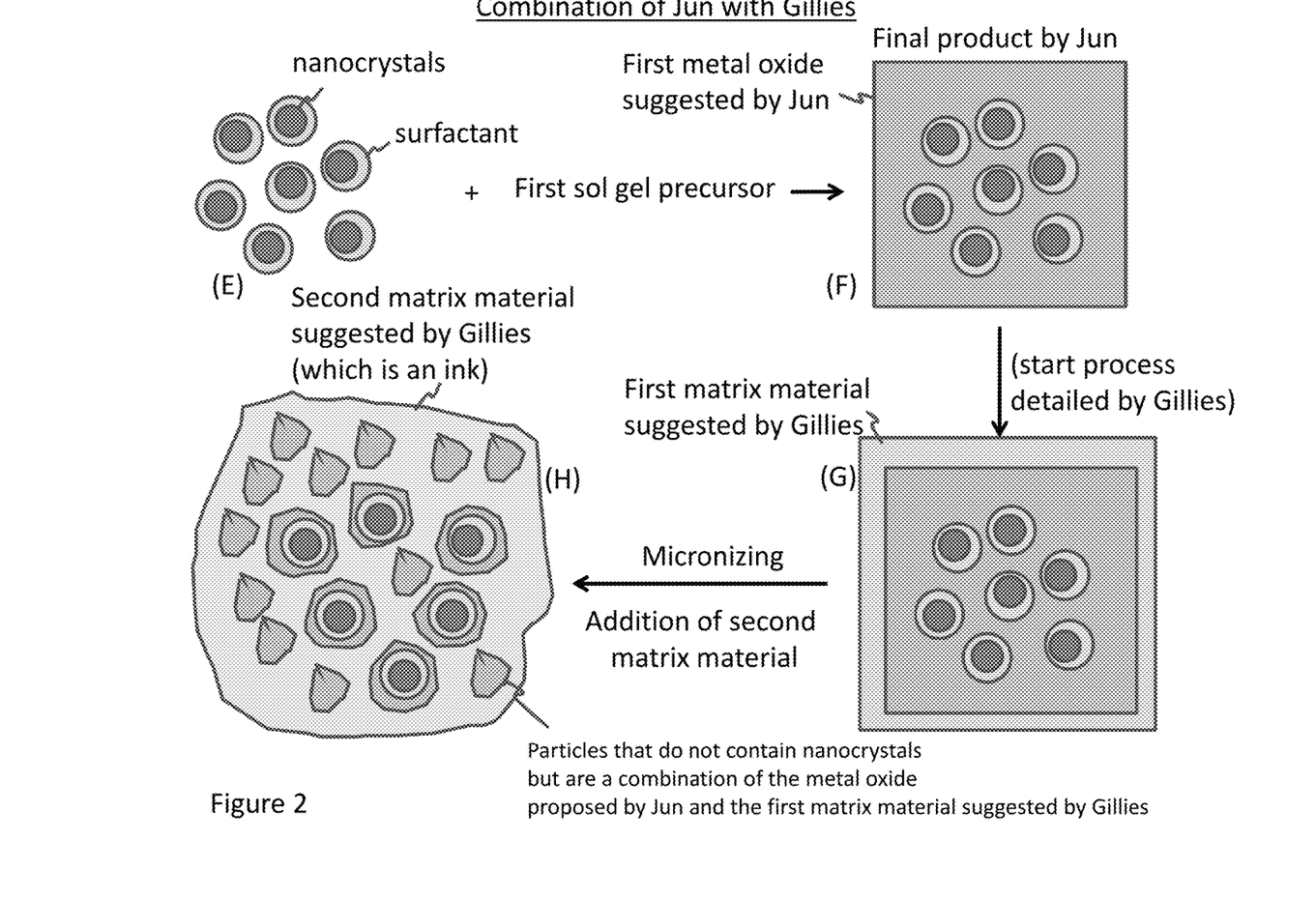
FIG. 2 is a graph showing changes in the efficiency of light-emitting devices (LEDs) fabricated in the Experimental Example 1 as a function of time.

The graph of FIG. 2 demonstrates that the LED using the composites prepared in Example 1, in which the metal oxide precursors are introduced through the two-step procedure, shows a slower decrease in efficiency, indicating enhanced stability when compared to the LED that was prepared using the composite prepared in Comparative Example 1.

Example 2

Step 2-1

CdSe/ZnS/CdS/ZnS semiconductor nanocrystals (NC, 1 wt %) that emit light at 520 nm are dispersed in toluene. Ethanol is added to the toluene solution (1 mL), followed by centrifugation. 1 mL of a 6-mercaptohexanol (6-MHOH)-ethanol solution is added to the precipitate obtained from centrifugation. The mixture is stirred until it becomes transparent.

Hexane is added to the solution to obtain a precipitate. 12.5 μL of MPS, 200 μL of TEOS, 100 μL of EtOH, 50 μL of 3-aminopropyltrimethoxysilane (3-APS) and 25 μL of $H_2O$ are mixed with the precipitate and stirred to obtain a transparent solution. The solution is dried at room temperature for 10 days and thermally treated at 100° C. for one hour.

Step 2-2

The products obtained in the previous step are pulverized using a mortar and pestle. 0.05 g of the powder is sampled. After the sample is placed in a vacuum system from which air is evacuated, TEOS vapor is fed into the vacuum system, followed by heating for 30 minutes. The vapor feeding is further repeated four times. The reaction mixture is pulverized and thermally treated in a glove box at 100° C. for about 15 minutes to prepare the nanocrystal-metal oxide composite.

Comparative Example 2

A comparative nanocrystal-metal oxide composite is prepared without undergoing Step 2-2.

Experimental Example 2

0.025 g of the composite prepared in Example 2 and 0.025 g of the composite prepared Comparative Example 2 are sampled. Each of the samples is mixed with 0.5 mL of a polydimethylsiloxane ("PDMS") resin (OE6665 resin), disposed on an LED device, and cured in an oven at 150° C. for one hour. The LED device is operated at 60 mA. The luminescent properties of the LED device are evaluated as a function of time. The results are shown in FIGS. 3 and 4.

Figure 3:
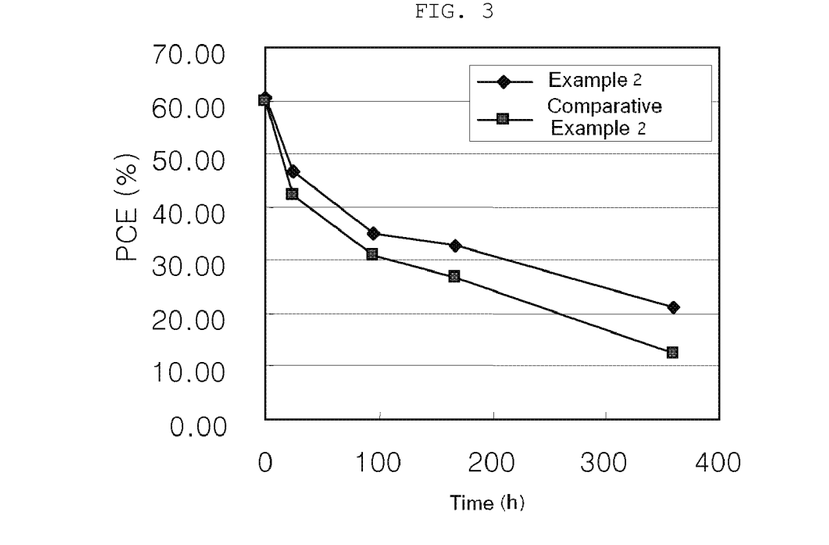
FIG. 3 is a graph showing changes in the efficiency of light-emitting devices fabricated in the Experimental Example 2 as a function of time.
Figure 4:
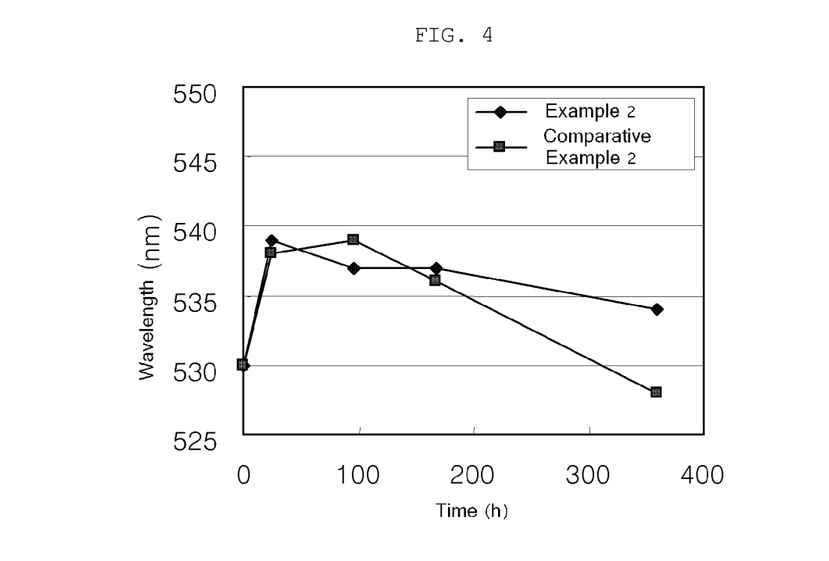
FIG. 4 is a graph showing changes in the emission wavelength of light-emitting devices fabricated in the Experimental Example 2 as a function of time.

The graph of FIG. 3 demonstrates that the LED using the composite prepared in Example 2, in which the metal oxide precursors were introduced via the two-step procedure, shows a slower decrease in efficiency with the lapse of time. Referring to FIG. 4, the emission wavelengths of the LED using the composite prepared in Example 2 are maintained at a relatively constant level especially when compared with the composite prepared in Comparative Example 2.

Example 3

Step 3-1

The procedure of Step 2-1 is repeated except that 25 μL of trifluoroacetic acid (FA) is used in place of 12.5 μL of MPS and the 50 μL of 3-APS. In addition, the amount of $H_2O$ is changed to 12.5 μL from 25 μL in the Step 2-1.

Step 3-2

The procedure of Step 2-2 is repeated except that MTMS (methoxytrimethylsilane) vapor is fed into the vacuum system instead of TEOS vapor.

Example 4

Step 4-1

The procedure of Step 3-1 is repeated.

Step 4-2

The products obtained in the previous step 4-1 are pulverized into a powder using a mortar and pestle. 0.05 g of the powder is sampled. The sample is allowed to react with 20 μL of TEOS and 60 μL of triethylamine (TEA) at room temperature for 2 days, and then the reaction mixture is thermally treated at 100° C.

Step 4-3

After the products obtained in the previous step 4-2 are placed in a vacuum system from which air is evacuated, MTMS (methoxytrimethylsilane) vapor is fed into the vacuum system, followed by heating for 30 minutes. The vapor feeding is further repeated four times to prepare nanocrystal-metal oxide composite.

Comparative Example 3

The procedure of Step 3-1 is repeated without undergoing Step 3-2 to prepare a comparative nanocrystal-metal oxide composite.

Experimental Example 3

0.025 g of the composite prepared in Example 3 and 0.025 g of the composite prepared Comparative Example 3 were sampled. The luminescent properties of LED devices using the respective samples were evaluated as a function of time in accordance with the procedure described in Experimental Example 2. The results are shown in FIGS. 5 and 6.

Figure 5:
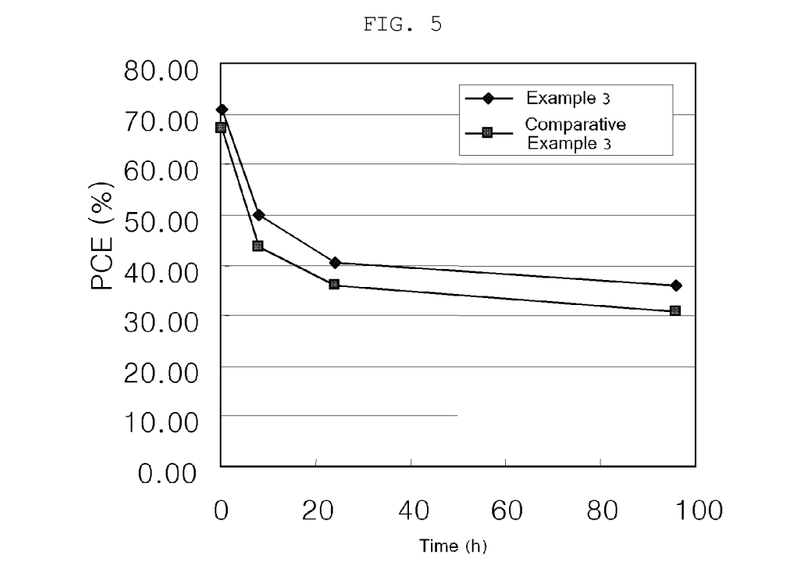
FIG. 5 is a graph showing changes in the efficiency of light-emitting devices fabricated in the Experimental Example 3 as a function of time.
Figure 6:
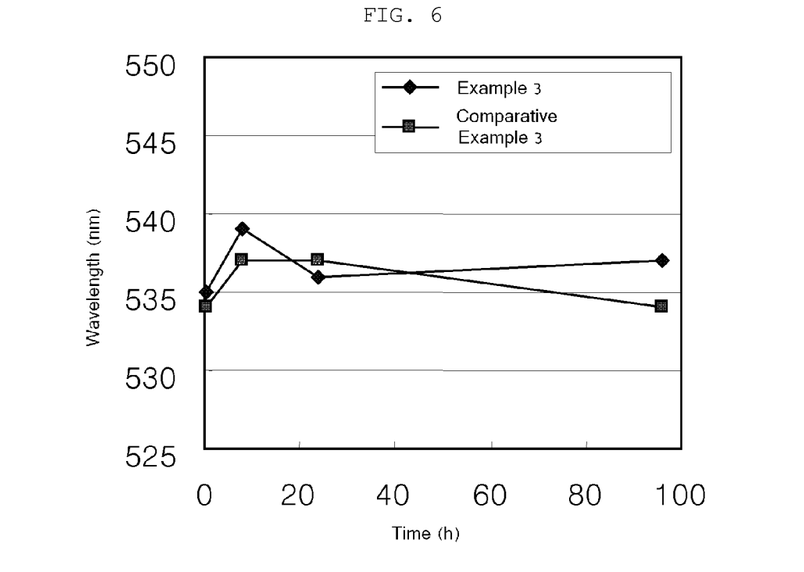
FIG. 6 is a graph showing changes in the emission wavelength of light-emitting devices fabricated in the Experimental Example 3 as a function of time.

The graph of FIG. 5 demonstrates that the LED using the composites prepared in Example 3, in which the metal oxide precursors were introduced through the two-step procedure, shows a slower decrease in efficiency with the lapse of time. Referring to FIG. 6, the emission wavelengths of the LED using the composites prepared in Example 3 are maintained at a relatively constant level.

Experimental Example 4

0.025 g of the composites prepared in Comparative Example 3, 0.025 g of the composites prepared in Step 4-2 and 0.025 g of the composites prepared in Step 4-3 were sampled. The luminescent properties of LED devices using the respective samples were evaluated as a function of time in accordance with the procedure described in the Experimental Example 2. The results are shown in FIGS. 7 and 8.

Figure 7:
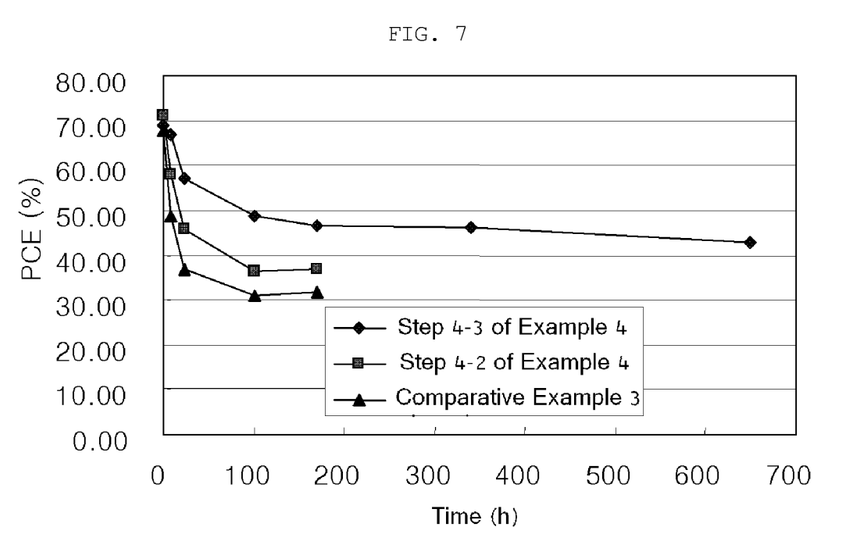
FIG. 7 is a graph showing changes in the efficiency of light-emitting devices fabricated in the Experimental Example 4 as a function of time.
Figure 8:
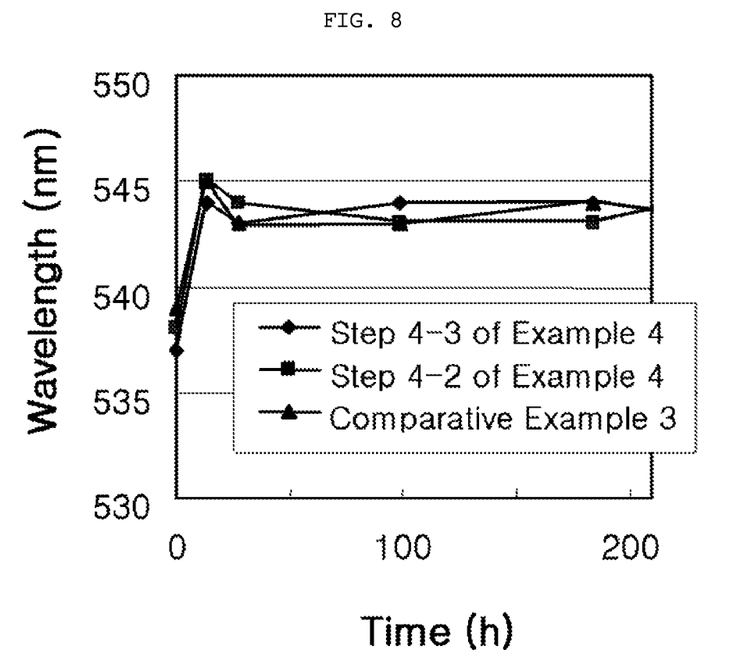
FIG. 8 is a graph showing changes in the emission wavelength of light-emitting devices fabricated in the Experimental Example 4 as a function of time.

The graph of FIG. 7 demonstrates that the LED using the composites prepared in Step 4-3, in which the metal oxide precursors are introduced through the two-step procedure and the composites prepared in Step 4-2 are capped by the capping material, shows a slower decrease in efficiency with the lapse of time. Referring to FIG. 8, it can be seen that the emission wavelengths of the LED using the composites prepared in Step 4-3 are maintained at a relatively constant level.

Although exemplary embodiments have been described herein those skilled in the art will appreciate that various modifications and changes are possible without departing from the spirit of the embodiment as disclosed in the accompanying claims. Therefore, it is to be understood that such modifications and changes are encompassed within the scope of the disclosed embodiments.

What is claimed is:

1. A method for preparing a nanocrystal-metal oxide composite, the method comprising:
    mixing nanocrystals, a first metal oxide precursor, a solvent, and water to form a solution,
    drying the solution, followed by a thermal treatment to form a sol-gel composite,
    pulverizing the sol-gel composite to obtain a sol-gel composite powder,
    mixing the sol-gel composite powder with a second metal oxide precursor to form a reaction mixture at room temperature,
    allowing the reaction mixture at an elevated temperature to react,
    pulverizing the resultant, and
    thermally treating the pulverized resultant to obtain a nanocrystal-metal oxide composite.

2. The method of claim 1, wherein the first metal oxide precursor has at least one organic functional group.

3. The method of claim 1, wherein the first and second metal oxide precursors are each independently selected from the group consisting of siloxane compounds, silane compounds, silsesquioxane compounds, titanium oxide precursors, aluminum oxide precursors, vanadium oxide precursors, zinc oxide precursors, tungsten oxide precursors, zirconium oxide precursors, hafnium oxide precursors, yttrium oxide precursors, iron oxide precursors, tin oxide precursors, tantalum oxide precursors, cerium oxide precursors, chromium oxide precursors, and combinations thereof.

4. The method of claim 3, wherein the siloxane compound is selected from the group consisting of bis(triethoxysilyl)ethane, bis(triethoxysilyl)butane, bis(triethoxysilyl)octane, bis(trimethoxysilyl)ethane, bis(trimethoxysilyl)butane, bis(trimethoxysilyl)octane, bis(triethoxysilyl)ethylene, bis(trimethoxysilyl)ethylene, bis(triethoxysilyl)acetylene, bis(trimethoxysilyl)acetylene, 1,3,5-tris(diethoxysilyl)cyclohexane, 1,3,5-tris(triethoxysilyl)benzene, and combinations thereof.

5. The method of claim 3, wherein the silane compound is selected from the group consisting of methyltrimethoxysilane, dimethyldimethoxysilane, propyltrimethoxysilane, propyltriethoxysilane, dipropyldimethoxysilane, octyltrimethoxysilane, octyltriethoxysilane, dioctyldimethoxysilane, hexadecyltriethoxysilane, ethyltriethoxysilane, trimethoxysilane, trimethylchlorosilane, octadecyltrichlorosilane, vinyltrimethoxysilane, vinyltriethoxysilane, hexamethyldisilazane, tetramethylorthosilicate, tetraethylorthosilicate, methyltrimethoxysilicate, 3-aminopropyltrimethoxysilicate, and combinations thereof.

6. The method of claim 3, wherein the silsesquioxane compound is 2,4,6,8-tetramethyl-2,4,6,8-tetra(trimethoxysilylethoxy)cyclotetrasiloxane.

7. The method of claim 3, wherein the titanium oxide precursor is selected from the group consisting of titanium chloride, titanium methoxide, titanium ethoxide, titanium propoxide, titanium butoxide, and combinations thereof.

8. The method of claim 3, wherein the zirconium oxide precursor is selected from the group consisting of zirconium chloride, zirconium ethoxide, zirconium hydroxide, zirconium isopropoxide, and combinations thereof.

9. The method of claim 1, wherein the nanocrystals are selected from the group consisting of Group II-VI compound nanocrystals, Group III-V compound nanocrystals, Group IV-VI compound nanocrystals, metal nanocrystals combinations thereof.

10. The method of claim 1, wherein the nanocrystals are further surface-treated with a surfactant having an affinity for the first metal oxide precursor and the second metal oxide precursor.

11. The method of claim 1, further comprising treating the surface or end portions of the nanocrystal-metal oxide composite with a capping material.

12. The method of claim 11, wherein the capping material is selected from the group consisting of methoxytrimethylsilane, trimethylchlorosilane, hexamethyldisilazane, octadecyltrichlorosilane, vinyltrimethoxysilane, vinyltriethoxysilane, and combinations thereof.

13. The method of claim 1, further comprising solidifying the nanocrystal-metal oxide composite to form a monolith; the monolith being a single indivisible unitary solid.

14. A method for preparing a nanocrystal-metal oxide composite, the method comprising:
    mixing nanocrystals, a first metal oxide precursor, a solvent, and water to form a solution,
    drying the solution, followed by a thermal treatment to form a sol-gel composite,
    pulverizing the sol-gel composite to obtain a sol-gel composite powder,
    mixing the sol-gel composite powder with a second metal oxide precursor to form a reaction mixture at room temperature,
    allowing the reaction mixture at an elevated temperature to react,
    pulverizing the resultant, and
    thermally treating the pulverized resultant to obtain a nanocrystal-metal oxide composite,
    wherein the second metal oxide precursor has at least one organic functional group, and
    wherein the first metal oxide precursor and the second metal oxide precursor are independently selected from different materials.

15. A method for preparing a nanocrystal-metal oxide composite, the method comprising:
    mixing nanocrystals, a first metal oxide precursor, a solvent, and water to form a solution,
    drying the solution, followed by a thermal treatment to form a sol-gel composite,
    pulverizing the sol-gel composite to obtain a sol-gel composite powder,
    mixing the sol-gel composite powder with a second metal oxide precursor, which is in a liquid or gas phase, to form a reaction mixture at room temperature,
    allowing the reaction mixture at an elevated temperature to react,
    pulverizing the resultant, and
    thermally treating the pulverized resultant to obtain a nanocrystal-metal oxide composite, wherein the second metal oxide precursor has at least one organic functional group.

* * * * *